(12) United States Patent
Vincent et al.

(10) Patent No.: US 7,193,605 B2
(45) Date of Patent: Mar. 20, 2007

(54) HIGH RESOLUTION DISPLAY

(75) Inventors: Kent D. Vincent, Cupertino, CA (US); R. Stanley Williams, Redwood City, CA (US); Xiao-An Zhang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 573 days.

(21) Appl. No.: 10/698,691

(22) Filed: Oct. 30, 2003

(65) Prior Publication Data

US 2004/0095309 A1    May 20, 2004

Related U.S. Application Data

(62) Division of application No. 09/981,166, filed on Oct. 16, 2001.

(51) Int. Cl.
*G09G 3/34*    (2006.01)

(52) U.S. Cl. .................................. 345/107; 345/296

(58) Field of Classification Search ........ 345/105–107, 345/84, 204; 359/296; 715/500
See application file for complete search history.

(56) References Cited

U.S. PATENT DOCUMENTS 6,661,563 B2 * 12/2003 Hayashi et al. ............. 359/296

\* cited by examiner

*Primary Examiner*—Alexander Eisen (57) ABSTRACT

Method and apparatus for document content publishing, distribution, and display, including a method of doing business. An electronic display includes at least one reusable imaging stratum forming a pixel array of a bi-modal molecular colorant. Preferably, the molecules have bistable orientations. The imaging stratum having a viewing surface and a back surface. Adjacent said back surface is a background stratum. An addressing device is mounted for selectively switching colorant molecules of the imaging stratum between a transparent orientation and a color-exhibiting orientation. The present invention is adaptable to reflective light, back lit, and projection implementations.

2 Claims, 5 Drawing Sheets

HIGH RESOLUTION DISPLAY

CROSS-REFERENCES TO RELATED APPLICATIONS

This application is a divisional of prior application Ser. No. 09/981166 filed Oct. 16, 2001.

STATEMENT REGARDING FEDERALLY SPONSORED RESEARCH OR DEVELOPMENT

None.

REFERENCE TO AN APPENDIX

The present application includes a hard copy appendix comprising pertinent specification pages and drawings of co-inventors' U.S. patent application Ser. No. 09/844,862, by ZHANG et al. for MOLECULAR MECHANICAL DEVICES WITH A BAND GAP CHANGE ACTIVATED BY AN ELECTRIC FIELD FOR OPTICAL SWITCHING APPLICATION (Hewlett-Packard Company, assignee) as relates to subject matter claimed in accordance with the present invention.

BACKGROUND OF THE INVENTION

1. Field of the Invention

The present invention relates generally to electronic document distribution and more particularly to a reusable, high resolution, display providing visual characteristics comparable to hard copy print.

2. Description of Related Art

There is growing interest in electronic document distribution in place of hard copy. The advent of the Internet facilitates distribution that provides virtually instantaneous access to document information while avoiding the high cost of printing, binding, warehousing, distribution, and retail mark-up that is associated with commercial documents. (The term Internet is used herein as a generic term for a collection of distributed, interconnected networks (ARPANET, DARPANET, World Wide Web, or the like) that are linked together by a set of industry standard protocols (e.g., TCP/IP, HTTP, UDP, and the like) to form a generally global, distributed network. Private and proprietary intranets are also known and are amenable to conforming uses of the present invention.) Further, the user quite often reads such hard copy only once and then discards it or stores it for future reference.

However, currently working against the clear advantages of electronic document distribution, computer displayed documents are of significantly poor quality relative to hard copy print and, at the least, less comfortably read. Standard cathode ray tube (CRT) and matrix liquid crystal displays (LCD) operate at resolutions approximately an order of magnitude lower than commercial print. As a result, the document image is usually magnified on display for better viewability but allowing only a fraction of a standard document page to be viewed at one time. Small character and image detail such as serifs and thin lines are lost, while larger character and image details are aliased or made fuzzy by grey-scaling the original data. Moreover, CRT displays are not portable and require the user to read documents at essentially fixed focal length and fixed body position for long periods of time, leading to eye and body discomfort. Flat panel, matrix LCD devices are lighter weight and more portable for easier focal distance and body repositioning, but are of poorer contrast and limited available viewing angle, leading to further reading discomfort and annoyance. Viewability of such displays also is affected by the ambient lighting in which the apparatus is being used; the higher the ambient light conditions, the worse the viewability of the displayed image or information.

Figure 1:
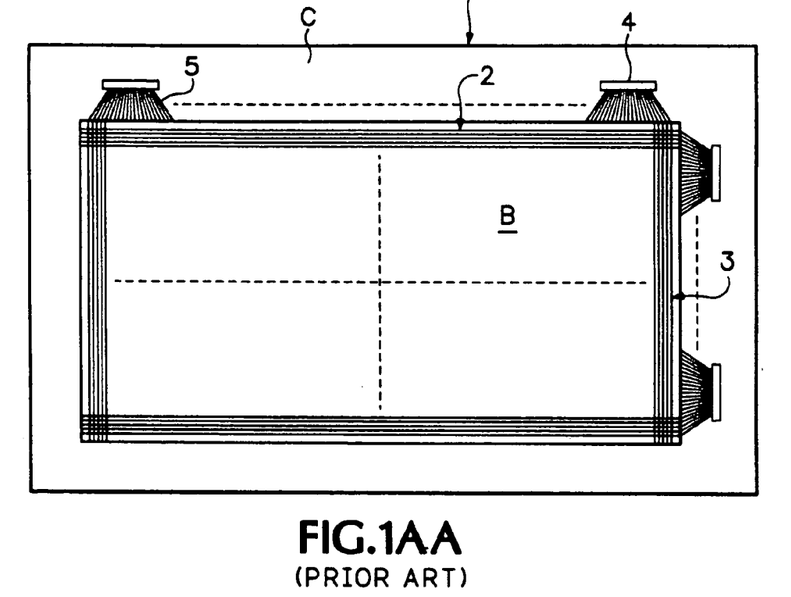

FIG. 1AA (Prior Art) exemplifies the basic operation of a flat panel electronic display, such as a commercially available, flat panel, LCD 1 (dashed lines are used in this drawing to indicate continuation of discrete elements of the apparatus so as to make the drawing less complicated). Basically, the LCD 1 includes a plurality of picture elements ("pixels") defining the resolution of the display, generally formed by an array of thin film transistors ("TFT") and too small to be seen in this FIGURE (e.g., 600 dots per inch ("dpi")). A plurality of gate lines 2 and data lines 3 form a pixel control grid for active area "B" of the panel 1. The gate lines 2 and data lines 3 extend as leads 5 outside of the active area B for connection to known manner integrated circuit drivers. A plurality of pads, one for each line, are formed in region "C" about the periphery of the active area B as discrete pad regions 4 are coupled by the leads 5 to the gate and data lines 2, 3. Color LCD is produced by backlighting the individually switched pixels crystals through color filters. Note importantly that the resolution of the screen is limited by the technology related to interconnect wiring—namely, between the gate and data lines and the microprocessor or memory sending data—and driver size for each pixel. Moreover, such a device requires power to maintain each pixel in its current state and continually to backlight the crystal screen.

Electrostatically polarized, bichromal particles for displays have been known since the early 1960's. There are at least two, well-published, electrochromic pixel coloring devices: (1) a microencapsulated electrophoretic colorant (electronic ink), and (2) a field rotatable bichromal sphere (e.g., the Xerox™ Gyricon™).

Electronic ink is a recent development. E Ink Corporation (Cambridge, Mass.; www.eink.com) provides an electronic ink in a liquid form that can be coated onto a surface. Within the coating are tiny microcapsules (e.g., about 30 μm to 100 μm in diameter, viz. about as thick as a human hair, thus quite visible to the naked eye). As illustrated in FIG. 1BB (Prior Art), each microcapsule 6 has white particles 7 suspended in a dark dye 8. When an electric field is applied and sustained in a first polarity, the white particles move to one end of the microcapsule where they become visible; this makes the surface appear white at that spot. A carrier 9 is provided. An opposite polarity electric field pulls the particles to the other end of the microcapsules where they are substantially hidden by the dye; this makes the surface appear dark at that spot.

The Xerox Gyricon sphere is described in certain patents. FIG. 1CC (Prior Art) is a schematic illustration of the sphere. U.S. Pat. No. 4,126,854 (Sheridon '854) describes a bichromal sphere having colored hemispheres of differing Zeta potential that allow the spheres to rotate in a dielectric fluid under influence of an addressable electrical field. U.S. Pat. No. 4,143,103 (Sheridon '103) describes a display system using bichromal spheres in a transparent polymeric material. U.S. Pat. No. 5,604,027 (Sheridon '027), issued Feb. 18, 1997, for SOME USES OF MICROENCAPSULATION FOR ELECTRIC PAPER, describes a printer. Essentially, each sphere 10 (again, about 30 μm in diameter) has a bichromal ball 13 having two hemispheres 11, 12, typically one black and one white, each having different electrical properties. Each ball is enclosed within a spherical shell 14 and a space 15 between the ball and shell is filled with a liquid to form a microsphere so that the ball is free to rotate in response to an electrical field. The microspheres can be mixed into a substrate which can be formed into sheets or can be applied to a surface. The result is a film which can form an image from an applied and sustained electrical field. Currently picture element ("pixel") resolution using this Gyricon spheres is limited to about 100 dpi.

Thus, in the known prior art, each individual colorant device is roughly hemispherically bichromal; one hemisphere is made the display background color (e.g. white) while the second hemisphere is made the print or image color (e.g. black or dark blue). In accordance with the text and image data, these microsphere-based devices are field translated or rotated so the desired hemisphere color faces the observer at each respective pixel. It can be noted that, in commercial practice, displays made from these colorants have relatively poor contrast and color. The layer containing the microcapsules is generally at least 3 or 4 microcapsules thick. Light that penetrates beyond the layer surface internally reflects off the backside hemispheres causing color (e.g. black and white) intermixing. This is caused by incomplete absorption or reflection of light by the surface of the microspheres and by light penetrating to sub-layers via the interstitial spaces between microspheres in each layer. The image is, for example, thus rendered dark gray against a light gray background. Thus, these technologies do not provide a promising extendability and scalability to high resolution color displays because the devices switch only between two opaque colors, disallowing passage of light from different layers for a given pixel. Still further, as is these technologies produce a visually poor display resolution relative to hard copy print due to the relatively large size of the microcapsule spheres. Moreover, the spheres are bichromal, limiting application to two color rather than true full color display. Further still, the need for overlapping spheres in multiple layers to achieve adequate color density limits pixel resolution. Yet another limitation is that these technologies suffer from poor pixel switching times in comparison to standard CRT and LCD technology. Each technology relies on the electrophoretic movement of a mass in a dielectric material, such as isoparafin. The color rotation speed of dichroic spheres under practical electrical field intensities is in the range of 20 milliseconds (ms) or more. These relatively large spheres require high switching voltages (e.g. 80–200 volts) to obtain adequate fields through the consequently thick (>100 μm) carrier-colorant layer. Such switching voltages add high cost to the pixel drive electronics, similar to that of the high-end matrix LCD apparatus. Thus, those involved in the development of microcapsule type colorants are struggling with the contrast, resolution, and speed rather than focusing on a new molecular level technology as described in accordance with the present invention.

There is a need for a method and apparatus which will overcome the problems and shortcomings of the state of the art and provide a cost-efficient, erasable and reusable, high contrast, high resolution displays, methods of displaying documents, and methods of doing business related thereto.

BRIEF SUMMARY OF THE INVENTION

In its basic aspect, the present invention provides an electronically addressable display including: a substrate; associated with the substrate, an addressable display bi-modal molecular colorant stratum; and associated with the molecular colorant stratum, an addressing device mounted for selectively switching colorant molecules of the stratum between at least two visually distinguishable states.

In another aspect, the present invention provides an electronic appliance including: an appliance housing; and incorporated with the housing, a display device, the display device including at least one writeable imaging stratum forming a pixel array of a bi-modal molecular colorant, and an addressing device mounted for selectively switching colorant molecules of the imaging stratum.

In still another aspect, the present invention provides a visual display including: at least one writeable imaging stratum forming a pixel array of a bi-modal molecular colorant; and at least one addressing device mounted for selectively switching colorant molecules of the imaging stratum.

In yet another aspect, the present invention provides a method of fabricating a rewritable display screen, the method including: depositing a substantially homogeneous layer of bi-modal molecular colorant on a surface; and providing addressable elements adjacent said surface for matrix addressing said surface as addressable picture elements.

In another aspect, the present invention provides a method of document retrieval using an internet, the method including: from a telecommunications appliance, ordering the document over the internet; downloading the document from the internet into the telecommunications appliance; and displaying the document on a display associated with the telecommunications appliance by forming an image of the document on a pixel array of a rewritable bi-modal molecular colorant.

Another aspect of the present invention is a method of doing business with respect to document publishing and retrieval, the method including: providing a wireless communications site including a server for publishing document content; and downloading from said site to a wireless telecommunications appliance document content data for read-only display by forming a selectable page-by-page pixel array on a bi-modal molecular colorant display associated with said appliance.

In another aspect, the present invention provides a wireless communications appliance, including: a wireless interface; a display screen having at least one writeable imaging stratum forming a pixel array of a bi-modal molecular colorant; and at least one addressing device mounted for selectively switching colorant molecules of the imaging stratum.

In another aspect, the present invention provides a projection apparatus including: a display means for projecting an image, said display means having a transparent substrate and, associated with said substrate, at least one writeable imaging stratum forming a pixel array of a bi-modal molecular system; and associated with said imaging stratum, at least one addressing means for selectively switching colorant molecules of the imaging stratum forming an image for projection.

In still another aspect, the present invention provides an electronically addressable display including: a translucent substrate having a means for backlighting said substrate associated therewith; associated with the substrate, an addressable display bi-modal molecular colorant system; and associated with the molecular colorant system, an addressing means mounted for selectively switching colorant molecules of the system between at least two visually distinguishable states wherein one of said states produces a color of high contrast with respect to said translucent substrate and another one of said states is transparent.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

BRIEF DESCRIPTION OF THE DRAWINGS

In accordance with 37 C.F.R. 1.84(u), in order to prevent confusion with drawings of the Appendix hereto, the drawings of this application use double capital letter suffices.

FIG. 1AA (Prior Art) is an exemplary LCD display.

FIG. 1BB (Prior Art) is an exemplary device incorporating electronic ink.

FIG. 1CC (Prior Art) is a schematic depiction of a Xerox Gyricon sphere.

FIG. 2AA is a schematic depiction (elevation view) of a first exemplary embodiment of flat panel type display in accordance with the present invention.

FIG. 3AA is a schematic depiction (elevation view) of a second exemplary embodiment of flat panel type display in accordance with the present invention.

FIG. 4AA is a schematic depiction (perspective, transparent view) of a two-color (e.g. black and white) display screen construction for use in accordance with the present invention as shown in FIGS. 2AA and 3AA.

FIG. 4BB is a detail for a colorant layer element of the present invention as shown in FIG. 4AA.

FIG. 5AA is a schematic depiction (perspective, transparent view) of a full-color display screen construction embodiment in accordance with the present invention as shown in FIGS. 2AA and 3AA.

FIG. 6AA is a schematic depiction of a scan addressing embodiment of a two-color display screen construction for use in accordance with the present invention as shown in FIGS. 2AA and 3AA.

FIG. 7AA is a block diagram illustration for a method and apparatus for doing business over the internet in accordance with the present invention.

FIG. 8AA is an illustration of an exemplary telecommunications appliance in the nature of a wireless-transceiver-ready personal digital assistant ("PDA") incorporating the present invention as depicted in FIGS. 4AA–4BB, or 5AA or 6AA.

FIG. 9AA is an illustration of an exemplary consumer appliance in the nature of a digital camera incorporating the present invention as depicted in FIGS. 4AA–4BB, or 5AA or 6AA.

FIG. 10AA is an illustration of an exemplary implementation of the present invention as depicted in FIGS. 4AA–4BB, or 5AA or 6AA, illustrating a retractable screen in a pen-sized device.

FIG. 11AA is an illustration of a telecommunications appliance in the nature of a wireless-transceiver-ready telephone incorporating the present invention as depicted in FIGS. 4AA–4BB, or 5AA or 6AA.

The drawings referred to in this specification should be understood as not being drawn to scale except if specifically annotated.

DETAILED DESCRIPTION OF THE INVENTION

Reference is made now in detail to a specific embodiment of the present invention which illustrates the best mode presently contemplated by the inventors for practicing the invention. Alternative embodiments are also briefly described as applicable.

Definitions

The following terms and ideas are applicable to both the present discussion and the Appendix hereto.

The term "self-assembled" as used herein refers to a system that naturally adopts some geometric pattern because of the identity of the components of the system; the system achieves at least a local minimum in its energy by adopting this configuration.

The term "singly configurable" means that a switch can change its state only once via an irreversible process such as an oxidation or reduction reaction; such a switch can be the basis of a programmable read-only memory (PROM), for example.

The term "reconfigurable" means that a switch can change its state multiple times via a reversible process such as an oxidation or reduction; in other words, the switch can be opened and closed multiple times, such as the memory bits in a random access memory (RAM) or a color pixel in a display.

The term "bistable" as applied to a molecule means a molecule having two relatively low energy states (local minima) separated by an energy (or activation) barrier. The molecule may be either irreversibly switched from one state to the other (singly configurable) or reversibly switched from one state to the other (reconfigurable). The term "multi-stable" refers to a molecule with more than two such low energy states, or local minima.

The term "bi-modal" for colorant molecules in accordance with the present invention may be designed to include the case of no or low activation barrier for fast but volatile switching. In this latter situation, bistability is not required, and the molecule is switched into one state by the electric field and relaxes back into its original state upon removal of the field; such molecules are referred to as "bi-modal". In effect, these forms of the bi-modal colorant molecules are "self-erasing". In contrast, in bistable colorant molecules the colorant molecule remains latched in its state upon removal of the field (non-volatile switch), and the presence of the activation barrier in that case requires application of an opposite field to switch the molecule back to its previous state. Also, "molecular colorant" as used hereinafter as one term to describe aspects of the present invention is to be distinguished from other chemical formulations, such as dyes, which act on a molecular level; in other words, "molecular colorant" used hereinafter signifies that the colorant molecules as described in the Appendix and their equivalents are employed in accordance with the present invention.

Micron-scale dimensions refers to dimensions that range from 1 micrometer to a few micrometers in size.

Sub-micron scale dimensions refers to dimensions that range from 1 micrometer down to 0.05 micrometers.

Nanometer scale dimensions refers to dimensions that range from 0.1 nanometers to 50 nanometers (0.05 micrometers).

Micron-scale and submicron-scale wires refers to rod or ribbon-shaped conductors or semiconductors with widths or diameters having the dimensions of 0.05 to 10 micrometers, heights that can range from a few tens of nanometers to a micrometer, and lengths of several micrometers and longer.

"HOMO" is the common chemical acronym for "highest occupied molecular orbital", while "LUMO" is the common chemical acronym for "lowest unoccupied molecular orbital". HOMOs and LUMOs are responsible for electronic conduction in molecules and the energy difference between the HOMO and LUMO and other energetically nearby molecular orbitals is responsible for the color of the molecule.

An "optical switch," in the context of the present invention, involves changes in the electro-magnetic properties of the molecules, both within and outside that detectable by the human eye, e.g., ranging from the far infra-red (IR) to deep ultraviolet (UV). Optical switching includes changes in properties such as absorption, reflection, refraction, diffraction, and diffuse scattering of electro-magnetic radiation.

The term "transparency" is defined within the visible spectrum to mean that optically, light passing through the colorant is not impeded or altered except in the region in which the colorant spectrally absorbs. For example, if the molecular colorant does not absorb in the visible spectrum, then the colorant will appear to have water clear transparency.

The term "omni-ambient illumination viewability" is defined herein as the viewability under any ambient illumination condition to which the eye is responsive.

As a general proposition, "media" in the context of the present invention includes any surface, whether portable or fixed, that contains or is layered with a molecular colorant or a coating containing molecular colorant in accordance with the present invention wherein "bistable" molecules are employed; for example, both a flexible sheet exhibiting all the characteristics of a piece of paper and a writable surface of an appliance (be it a refrigerator door or a computing appliance using the molecular colorant). "Display" (or "screen") in the context of the present invention includes any apparatus that employs "bi-modal" molecules, but not necessarily bistable molecules. Because of the blurred line regarding where media type devices ends and display mechanisms begin, no limitation on the scope of the invention is intended nor should be implied from a designation of any particular embodiment as a "media" or as a "display."

As will become apparent from reading the Detailed Description and Appendix, "molecule" can be interpreted in accordance with the present invention to mean a solitary molecular device, e.g., an optical switch, or, depending on the context, may be a vast array of molecular-level devices, e.g., an array of individually addressable, pixel-sized, optical switches, which are in fact linked covalently as a single molecule in a self-assembling implementation. Thus, it can be recognized that some molecular systems comprise a super-molecule where selective domain changes of individual molecular devices forming the system are available. The term "molecular system" as used herein refers to both solitary molecular devices used systematically, such as in a regular array pixel pattern, and molecularly linked individual devices. No limitation on the scope of the invention is intended by interchangeably using these terms nor should any be implied.

General Exemplary Devices

Figure 2:
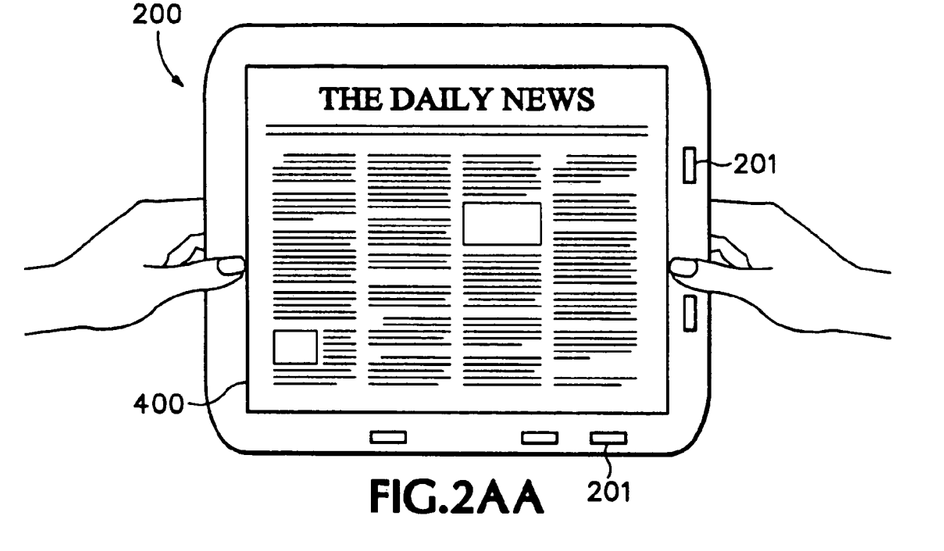
Figure 3:
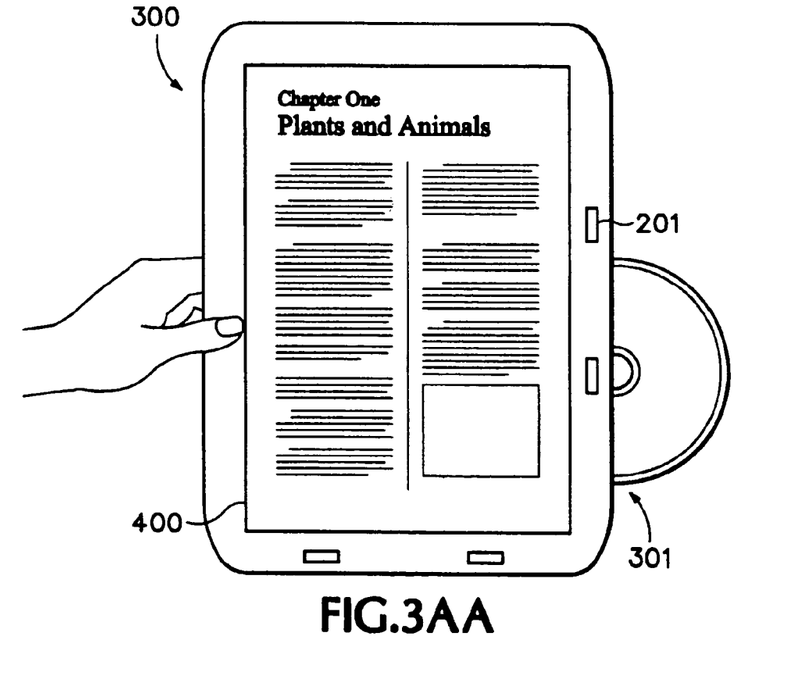

FIGS. 2AA and 3AA depict exemplary embodiments of display devices 200, 300 in accordance with the present invention. FIG. 2AA represents a handheld, landscape format, implementation which can be connected (wired or wireless, e.g. infrared or radiowave) to computer or telecommunications apparatus (not shown), including internet capable apparatus, for downloading data onto the display 200. {"Internet" is used herein as a generic term for a collection of distributed, interconnected networks (ARPANET, DARPANET, World Wide Web, or the like) that are linked together by a set of industry standard protocols and the like) to form a global (or sub-global) distributed network.} FIG. 3AA represents a handheld, portrait format, implementation of the display device 300 that similarly to the display device 200 of FIG. 2AA could be connected to computer or telecommunications apparatus. Either may optionally incorporate a self-reliant CDROM drive subunit 301 (as illustrated), PCMCIA flash memory subunit (not shown), or the like. In either embodiment, it is intended, as shown, that the display 200, 300 be to some extent portable. Specific implementations are to be provided with associated circuitry to download, store, sequence, and display images as would be known in the art.

Figures 4, 5:
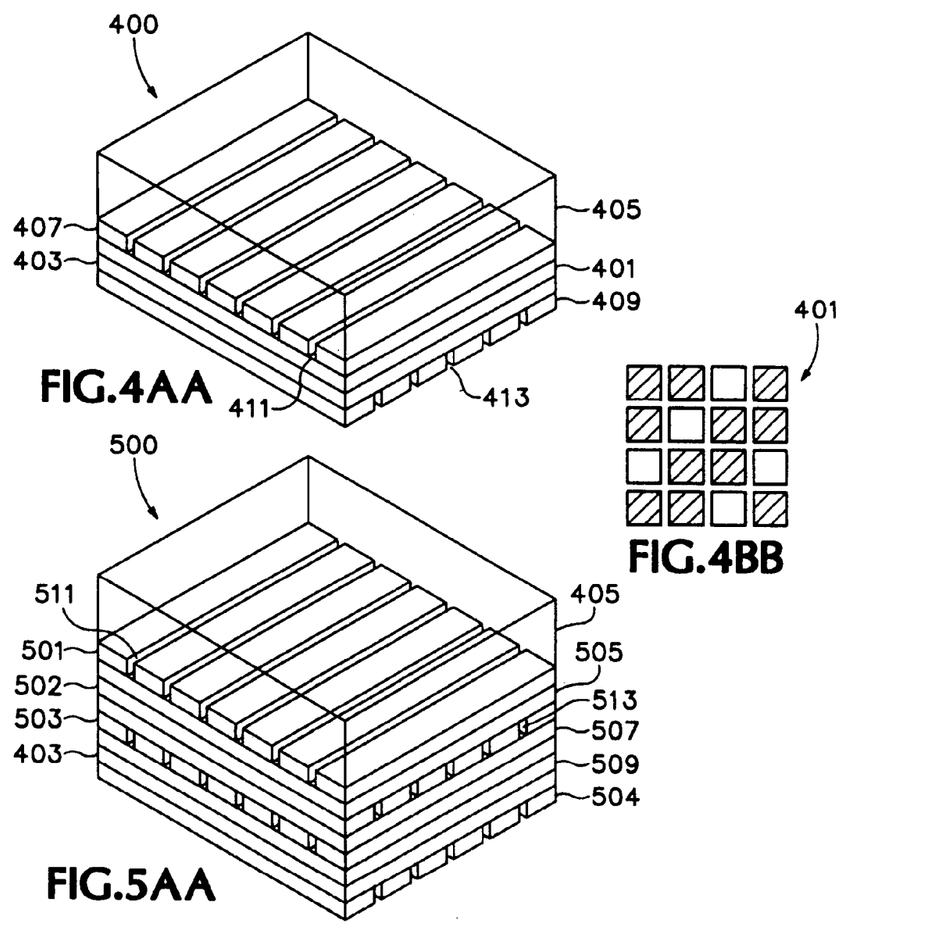

Turning to FIGS. 4AA and 4BB, in accordance with the present invention, each display device 200, 300 of FIGS. 2AA and 3AA has a display screen 400 that incorporates at least one colorant layer 401, comprising a molecular colorant in accordance with the present invention. The screen 400 includes a substrate 403 and at least one colorant layer 401. Note that the display screen 400 substrate will likely have a thickness measured in millimeters whereas the colorant layer will have a thickness measured in microns; therefore no attempt is made herein to provide an accurate scaling to these FIGURES nor FIGS. 5AA and 6AA.

The colorant layer 401 is an addressable pixel array that employs electrical field switchable, reconfigurable, bi-modal molecules as described in detail in the Appendix hereto; generically referred to hereinafter as the "colorant molecule" and wherein the addressable colorant layer 401 is referred to as the "molecular colorant." Each reconfigurable, bi-modal colorant molecule is field switchable between an image color state (e.g. black) and transparent state, or between two different color states (e.g., a red state and a green state). Because the present display pixels are activated at a molecular level, the present display 400 is capable of at least the same contrast and resolution as hard copy print. A molecular colorant is ideal because its component molecules' size and mass are relatively infinitesimally small, allowing resolution and colorant switching times that are limited only by the capabilities of related field writing electrodes and circuitry. Like traditional liquid ink, the colorant layer 401 may develop adequate color density in a 1-to-2 micron thin layer, potentially lowering the field voltage required to switch the colorant between logic states and thus allowing the use of inexpensive drive circuitry.

It is expressly contemplated that both projection screen displays and back-lit or non-back-lit screen displays can be implemented in accordance with the present invention. The substrate 403 forming the background of the molecular colorant will generally be opaque such that the transparent or black states show accordingly at a very high contrast and resolution. However, it will be recognized that by substituting a transparent or translucent substrate, both back-lit and non back-lit type screens can be implemented.

Molecular Colorant/Colorant Molecules

A brief summary here of these novel colorant molecules will facilitate understanding of the present invention. More specific detail is provided in the aforementioned Appendix. The bi-modal colorant molecules employed in accordance with the present invention are active optical devices that can be switched using an external electric field. The use of multi-modal colorant molecules (i.e., tri-stable et seq.) are also envisioned in accordance with the present invention. Preferably, the colorant molecules are bistable.

Molecules evidencing one of several new types of switching are provided for the colorant layer 101. That is to say, the present invention introduces several new types of switching mechanisms that distinguish it from the prior art:

(1) an electric field ("E-field") induced rotation of at least one rotatable section (rotor) of a molecule to change the band gap of the molecule;

(2) E-field induced charge separation or recombination of the molecule via chemical bonding change to change the band gap; and (3) E-field induced band gap change via molecular folding or stretching. Thus, the color switching is the result of an E-field induced intramolecular change rather than a diffusion or oxidation/reduction reaction, in contrast to prior art approaches. Also, the part of the molecule that moves is quite small, so the switching time is expected to be quite fast. Also, the molecules are much simpler and thus easier and cheaper to make than the rotaxanes, catenanes, and related compounds.

Figure 6:
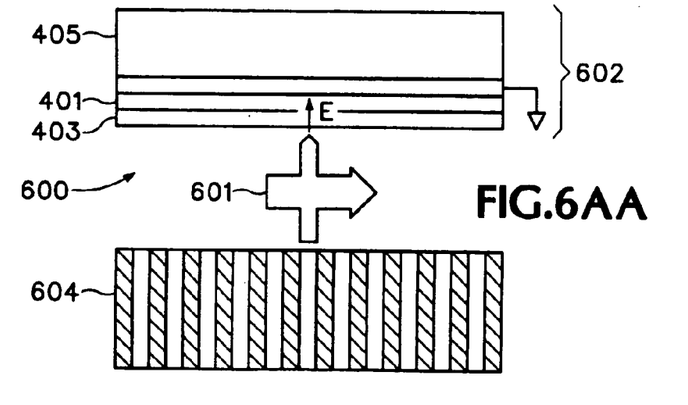
Figure 7:
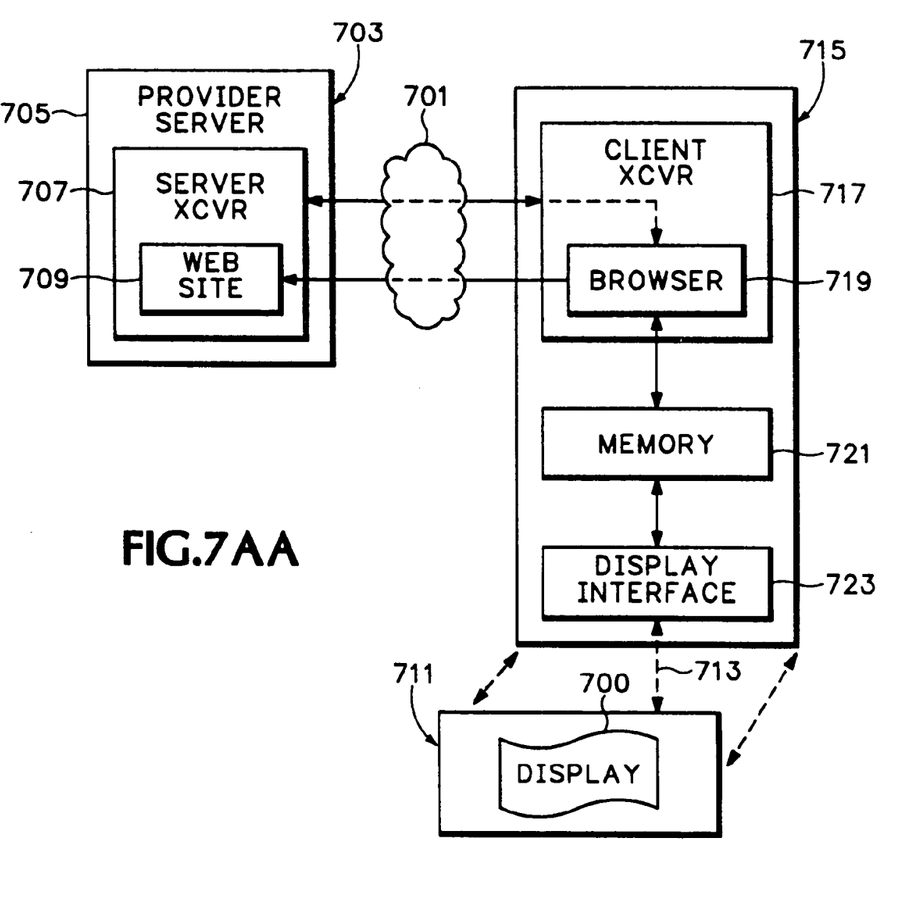

The following are examples of model molecules with a description of their function, with supporting examples, provided in the Appendix hereto:

(1) E-field induced band gap change via molecular conformation change (rotor/stator type of model)—Appendix FIGS. 4 and 5a–5c;

(2a) E-field-induced band gap change caused by the change of extended conjugation via charge separation or recombination accompanied by increasing or decreasing band localization—Appendix FIG. 6a;

(2b) E-field-induced band gap change caused by change of extended conjugation via charge separation or recombination and p-bond breaking or formation—Appendix FIG. 6b; and (3) E-field-induced band gap change via molecule folding or stretching—Appendix FIG. 7.

As one exemplary embodiment, to provide some general understanding of the colorant molecules, consider a device employing the type (1) colorant molecule listed above. The general idea is to design into the colorant molecules an electrically rotatable segment ("rotor") that has a large dipole moment and that links other portions of the colorant molecule that are immobilized ("stators"). Under the influence of an applied electric field, the vector dipole moment of the rotor will attempt to align parallel to the direction of the external field. However, the preferable colorant molecule is designed such that there are inter- and/or intra-molecular forces that stabilize the rotor in particular orientations with respect to the stators. Thus, a relatively large electric field is required to cause the rotor to unlatch from its initial orientation and rotate with respect to the stators. Once switched into a particular orientation, the bistable colorant molecule will remain in that orientation until it is switched out, or "reconfigured". However, a key component of the colorant molecule design is that there is a steric repulsion that will prevent the rotor from rotating through a complete 180-degree half cycle. Instead, the rotation is halted by the steric interaction of bulky groups on the rotor and stators at an optically significant angle of typically between 10° and 170° from the initial orientation. Furthermore, this switching orientation may be stabilized by a different set of inter- and/or intra-molecular hydrogen bonds or dipole interactions, and is thus latched in place even after the applied field is turned off. For the preferable colorant molecules, this ability to latch the rotor between two states separated by an optically significant rotation from the stators is important; this obviates the need for a holding field once the current "page" is displayed. Again, note that the foregoing strategy may be generalized to design colorant molecules to provide several switching steps so as to allow multiple states (more than two) to produce a multi-state (e.g., multi-color) system. Such a system permits the optical properties of the molecular system to be tuned continuously with a decreasing or increasing electric field or changed abruptly from one state to another by applying a pulsed field. Other methods and apparatus for full color display are described in more detail hereinbelow.

Further, the colorant molecules may be designed to include the case of no or low activation barrier for fast but volatile switching. In this latter situation, bi-stability is not required, and the colorant molecule is switched into one state by the electric field and relaxes back into its original state upon removal of the field. In effect, these forms of the bi-modal colorant molecules are "self-erasing." In contrast, with bistable colorant molecules, the colorant molecule remains latched in its state upon removal of the field (non-volatile switch), and the presence of the activation barrier in that case requires application of an opposite field to switch the colorant molecule back to its previous state. When the rotor and stators are all co-planar, the colorant molecule is referred to as "more-conjugated." Thus, the non-bonding electrons, or p-electrons, or p-electrons and non-bonding electrons of the colorant molecule, through its highest occupied molecular orbital (HOMO) and lowest unoccupied molecular orbital (LUMO) are substantially delocalized over the entire colorant molecule. This is referred to as a "red-shifted state" for the colorant molecule (referring to molecular state, not actual color or hue), or "optical state I." In the case where the rotor is rotated out of conjugation by approximately 90° with respect to the plane of the stators, the extended conjugation of the colorant molecule is broken and the HOMO and LUMO are no longer de-localized over the entire colorant molecule, referred to as "less-conjugated." This is a "blue-shifted state" of the colorant molecule, or "optical state II." Thus, the colorant molecule is reversibly switchable between two different optical states.

Referring briefly to FIG. 4BB, the colorant layer 401 comprises these bi-modal colorant molecules arrayed such that a selected set of molecules correlates to one pixel 402 (note, in practice the pixels are contiguous). The colorant layer 401 is a thin layer coated on a background substrate 403 layer having the display's intended background color (e.g. white). The substrate may comprise, for example, a high dielectric pigment (e.g. titania) in a polymer binder that provides good white color and opacity while also minimizing the voltage drop across the layer. The stratified combination of colorant layer 401 and substrate 403 thus is fully analogous to a layer of ink on paper. In a blank mode, or erased state, each molecule is switched to its transparent orientation; the "layer of ink" is invisible. The background (i.e., white pixels) shows through in those pixel areas where the colorant layer 401 molecules are switched to the transparent orientation. A transparent view-through 405 layer, such as of a clear plastic or glass, is provided superjacent to the colorant-background sandwich to provide appropriate protection. The view-through 405 layer has a transparent electrode array 407 for pixel column or row activation mounted thereto and positioned superjacently to the colorant layer 401. The background substrate 403 layer has a complementary electrode array 409 for pixel row or column activation mounted thereto (it will be recognized by those skilled in the art that a specific implementation of the stratification of the electrode arrays 407, 409 for matrix addressing and field writing of the individual pixels may vary in accordance with standard electrical engineering practices). Optionally, the pixels are switched by employing thin film transistor (TFT) driver technology as would be known in the art.

Thus, in summary, for use as a display device 200, 300 (in screen 400), suitable reconfigurable colorant molecules have optical properties (e.g., color) determined by the extent of their conjugation. The optical properties, including color or transparency, of the colorant molecule change with field polarity applied across the colorant molecules forming each pixel and preferably remains chromatically stable in the absence of a field. By disrupting the continuity of conjugation across a molecule, the molecule may be changed from one optical state to another, e.g., colored to transparent or from one color to another. Electric dipoles may be designed into the colorant and can physically cause this disruption by rotating or otherwise distorting certain segments of the molecule relative to other segments when the external electric field is applied or changed.

For the present invention, the colorant layer 401 is a substantially homogenous coating having the colorant molecules which are preferably colored (e.g. black, cyan, magenta or yellow) in a more-conjugated orientation and transparent in a less-conjugated orientation. By making the abutting background substrate 403 white, the colorant layer 401 may thereby produce high contrast black and white, and colored images. The colorant layer 401 may comprise a single field switchable dye or pigment or mixture of different switchable dyes that collectively produce a composite color (e.g. black). By using molecular colorant, the resolution of the produced image is limited only by the electric field resolution produced by the electrode array 407, 409. The molecular colorant additionally has virtually instantaneous switching speed, beneficial to the needs of fast scanning (as described with respect to FIG. 6AA hereinafter). The molecular colorant may be contained in a polymeric layer. Polymers for producing such coatings are well known (e.g. acrylates, polyurethane, UV curable resins). Alternatively, there may be a thin film deposited or self-assembled.

Specific Device Embodiments

In a first implementation embodiment as demonstrated in FIGS. 2AA and 3AA, the colorant layer 401 (FIG. 4AA) is offered as a substitute for matrix-addressed liquid crystal flat panel displays. As is known in the art, each pixel is addressed through rows and columns of fixed-position electrode arrays 407, 409. The fixed position electrode arrays 407, 409 consist of standard crossbar electrodes 411, 413 that sandwich the colorant layer 401 to form an overlapping grid (matrix) of pixels, each pixel addressed at the point of electrode overlap. The crossbar electrodes 411, 413 comprise parallel, spaced, electrode lines arranged in electrode rows and columns, where the row and column electrodes are separated on opposing sides of the colorant layer 401. Preferably, a first set of transparent crossbar electrodes 411 (or see also the arrays 501, 503 in FIG. 5AA described in detail hereinafter) is formed by thin film deposition of indium tin oxide (ITO) on a transparent substrate (e.g. glass). These row addressable pixel crossbar electrodes 411 are formed in the ITO layer using standard thin film patterning and etching techniques. The colorant layer 401 and background substrate 403 layer are sequentially coated over or mounted to the transparent electrode array 407 layer, using standard thin film techniques (e.g., vapor deposition and the like) or thick film techniques (e.g. silkscreen, spin cast, or the like). Additional coating techniques include Langmuir-Blodgett deposition and self-assemble monolayers. Column addressable pixel crossbar electrodes 413 (or see also the arrays 502, 504 in FIG. 5AA) are preferably constructed in like manner to the row electrodes 411. In general, the colorant layers and electrode layers can be stacked according to the needs of a specific implementation. To improve resolution even further, it is possible to combine the present invention with molecular wire technology such as taught in U.S. Pat. No. 6,128,214 (Kuekes et al.) and its Related Applications (each assigned to the common assignee herein and incorporated herein by reference) whereby pixel size-addressability ceases to be a limitation.

The display devices in accordance with the present invention provide print-on-paper-like contrast, color, viewing angle, and omni-ambient illumination viewability by elimination of the polarization layers required for known liquid crystal colorants. The present invention also allows a significant reduction in power drain. Whereas liquid crystals require a holding field even for a static image, the present colorant layer 401 molecules can be in a selected pixel-by-pixel modal state in the absence of a field when bistable molecules are used. Thus, the present colorant layer 401 when using bistable colorant molecules only requires a field when a pixel is changed, and then only for that pixel. The power and image quality improvements will provide significant benefit in battery life and display readability, under a wider range of viewing and illumination conditions for appliances (e.g. wristwatches, calculators, cell phones, or other remote electronic applications) and computer and camera displays, television screens, projection screens, and the like.

Furthermore, the colorant layer may comprise a mosaic of colored pixels using an array of bi-modal color molecules of various colors, viz., each mosaic pixel comprising bimodal molecular switch with differing chromophores. In other words, each pixel is in fact a super-pixel comprising individual subpixels composed of different bi-modal color molecules. In turn, each subpixel contains millions of the predetermined molecules for the selected transparent-color characteristic of the subpixel. In a simple example, a pixel can have four separately addressable subpixels in a color-next-to-color mosaic: the three subtractive primary colors, i.e., one cyan subpixel, one magenta subpixel, one yellow subpixel, and one black subpixel, wherein each molecule also has a transparent mode or state. The black or one or more of the three colors are addressed in writing to a target pixel in a manner analogous to commercial color displays in the current state of the art, e.g., a LCD, CRT, and the like. Basically, as human perception is substantially less discriminating (e.g., inability to distinguish over 1000 dpi or less) than current technology for depositing subpixels (e.g., using an adapted 1200 dpi, or greater, dpi ink-jet pen for depositing pixels and subpixels of the colorant layer 401 in a mosaic on the substrate 403), the mosaic color-next-to-color mosaic methodology presents a visually seamless imaging capability.

Since each colorant molecule is transparent outside of the colorant absorption band, viz., the transparent state, multiple colorant layers may be superimposed in a color-on/over-color embodiment (analogous to depositing droplets of wet ink by an ink-jet pen in a dot-on-dot manner, e.g., laying a predetermined yellow droplet over a predetermined cyan droplet to form the desired hue at the target pixel), where each layer is separately addressed to produce higher resolution color displays than currently available.

So far, the description of the present invention has assumed that the background substrate 403 is fabricated of an opaque, reflective material, e.g., a white plastic, and that the viewing of such a display device 200, 300 (FIG. 2AA, 3AA) is dependent upon reflected light. However, it is important to note that a substantive and substantial advantage of the present invention is that the same mechanism is also useful for implementations in a backlit configuration or a projection configuration.

Assume that the background substrate 403 of the viewing screen 400 is a translucent material. The material should be of a color, e.g., a translucent white or yellow polymer film, that is substantially reflective in an average ambient lighting situation but substantially transmissive of light when configured in a backlit configuration. Such an implementation may be important for a notebook computer or PDA where use in a variety of ambient lighting conditions is inevitable. In a dark ambient setting, a back-lighting beam, generally implemented in a known manner, whereby pixels wherein the colorant molecules are in a transparent state permit the light to pass through the colorant layer(s) 401 while the pixels having their colorant molecules in the black state block light from passing through. Other than to turn on the back-lighting beam mechanism, no special manipulation of the screen state or the data used to create an image or text is required when moving from a suitable reflective light condition to a dark ambient condition. Since the lighting is not used under sufficient reflective ambient lighting, battery life is extended in portable appliances employing the present invention. Moreover, as discussed below, with full color implementations, the present invention may be implemented as a video screen having equivalent resolution to commercial high definition television (HDTV).

Assume next that the background substrate 403 of the viewing screen 400 is a transparent material, e.g., glass, plastic film, or the like. Now the display device viewing screen is fully adapted for a combination with appropriate lenses as would be known in the art to for a projection apparatus. An exemplary embodiment is a fully automated overhead projector wherein the glass bed normally used for laying out a slide instead incorporates the molecular colorant in accordance with the present invention and a mechanism, e.g., software, for transferring computer generated slides directly to the projector glass bed.

Note that this is a major advancement to the state of the art for displays whereby one technology is adapted to all three forms of viewability, via reflective, backlit, and projection modes, without any fundamental changes being required of the core aspect, the nature of the colorant. Note also that through the use of a plurality of different colorant molecules or appropriate primary color pixel matrix implementation, full color embodiments can be provided. One such embodiment is now described with respect to FIG. 5AA.

FIG. 5AA is a schematic illustration of a second implementation embodiment. A high resolution, full color, matrix addressable, display screen 500 comprises alternating layers of transparent electrodes—row electrode arrays 501, 503 and column electrode arrays 502, 504—and a plurality of colorant layers 505, 507, 509, each having a different color bi-modal molecule construction. Since each pixel in each colorant layer may be colored or transparent, the color of a given pixel may be made from any one or a combination of the color layers (e.g. cyan, magenta, yellow, black) at the full address resolution of the display. When all colorant layers 505, 507, 509 for a pixel are made transparent, the pixel shows the background substrate 403 layer (e.g. white). Such a display offers the benefit of three or more times resolution over a conventional CRT and present matrix LCD devices that rely on single layer mosaic color.

It can now be recognized that a color display screen 400, 500 using fixed position electrode arrays may be made through either a single layer color mosaic (FIGS. 4AA, 4BB) or stratified, multi-color colorant layers and electrodes (FIG. 5AA). Color mosaic fabrication processes are well known and commonly used in the flat panel display industry; commercial manufacturers such as Brewer Scientific, Topan Printing, Dai-Nippon Printing provide such processes. As mentioned, ink-jet deposition may be employed. {The art of ink-jet technology is relatively well developed. Commercial products such as computer printers, graphics plotters, copiers, and facsimile machines employ ink-jet technology for producing hard copy. The basics of this technology are disclosed, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No.1 (February 1994) editions. Ink-jet devices are also described by W. J. Lloyd and H. T. Taub in *Output Hardcopy* (sic) *Devices*, chapter 13 (Ed. R. C. Durbeck and S. Sherr, Academic Press, San Diego, 1988).} Each colorant 401, 505, 507, 509 layer composition (e.g. dye and polymer) can be formulated similarly to a standard ink-jet ink. Present day ink-jet print heads are fully capable of printing pixel dots at 1200 dpi resolution and better. Details regarding methods and apparatus for forming a colorant layer are also described in U.S. patent application Ser. No. 09/919394, filed Jul. 31, 2001, by common inventors Vincent et al. for a FIELD ADDRESSABLE REWRITABLE MEDIA. However, further detail other than provided herein is not strictly necessary for understanding the present invention. Typical mosaic patterns comprise a regularly repeated pattern of three or four colors (e.g. cyan, magenta and yellow) in a two dimensional array of pixels that align with the crossbar electrode row and column intersections.

The multi-color multi-layer colorant display screen 500 is constructed from alternating electrode array layers 501–504 and colorant 505, 507, 509 layers. Each colorant layer 505, 507, 509 contains a different colorant composition of the bi-modal molecular elements that can be field switched between transparent and a desired different color (e.g. cyan, magenta or yellow). Preferably, a first array 501 of transparent row electrodes 511, is formed (on a transparent substrate as described above with respect to FIG. 4AA, row electrodes 407). A first colorant (e.g. yellow) 505 layer is coated over the row electrode array 501. Again, this may be accomplished using standard thick film techniques, such as silkscreen or spin cast. A first array 502 of column electrodes 513, is deposited and etched over the first colorant 505 layer. The second colorant (e.g. magenta) 507 layer is coated over the first column electrode array 502. A second array 503 of row electrodes 511, is likewise formed over the second colorant 507 layer, followed by deposition of the third colorant (e.g. cyan) 509 layer. This final colorant 509 layer is coated with a deposition on the background substrate 403 (e.g. a white coating) layer, again composed of a polymer containing a high dielectric, opaque white pigment (e.g. titania). A second array 504 of column electrodes 513 is then adhered to (or otherwise deposited on) the background substrate 403. Each of the electrode arrays is extended on different sides outside of the image area for connection to their respective electrode drive electronics (see e.g. FIG. 1AA). Optionally, it may be advantageous to a specific implementation if the electrodes are nearest, or bridging, the colorant layer(s) so that the voltage requirements are optimized.

The color to be set for each pixel is addressed by applying a voltage across the electrodes directly adjacent to the selected color layer. In the example given, pixels in the yellow layer are addressed through row electrode array 501 and column electrode array 502, magenta through column electrode array 502 and row electrode array 503, and cyan through row electrode array 503 and column electrode array 504. This simple common electrode addressing scheme is made possible because each colorant molecule is color stable in the absence of a field.

FIG. 6AA depicts a third implementation embodiment which employs scan-addressing rather than matrix-addressing. Matrix address displays are limited in resolution by the number of address lines and spaces that may be patterned over the relatively large two-dimensional surface of a display, each line connecting a pixel row or column to the outer edge of the display area (see e.g., FIG. 1AA). In accordance with this third embodiment, the bi-modal molecular colorant 401 and background substrate 403 layer construction is combined with a scanning electrode array printhead to provide a scanning electrode display 600 apparatus having the same readability benefits as the first two embodiments. Scanning electrode arrays and drive electronics are common to electrostatic printers and their constructions and interfaces are well known. Exemplary scanning electrode arrays that can be employed in construction of the present invention are shown in U.S. Pat. No. 4,058,814 (Brown) or U.S. Pat. No. 4,588,997 (Tuan et al.) incorporated herein by reference. Basically, remembering that the bistable molecular switch does not require a holding field, the scanning electrode array display 600 apparatus changes a displayed image by imaging or writing a pixel row at a time. The scanning electrode array display 600 apparatus thus provides even greater resolution than a fixed matrix-electrode array embodiment by virtue of the ability to alternate odd and even electrode address lines along opposing sides of the array, to include multiple address layers with pass-through array connections and to stagger multiple arrays that proportionately superimpose during a scan. The colorant layer 401 may again be patterned with a color mosaic to produce an exceptionally high resolution scanning color display.

More specifically, the third embodiment as shown in FIG. 6AA comprises a display screen 602 (which may be substituted for screen 400 in FIGS. 2AA and 3AA), a scanned electrode array 604, and array translation mechanism 601 to accurately move the electrode array 604 across the surface of the screen 602. The display screen 602 again comprises a background layer 403, a transparent view-through 405 layer, and at least one bi-modal molecule colorant layer 401. The colorant layer 401 may include a homogeneous monochrome colorant (e.g. black) or color mosaic, as described herein above. The scanned electrode array 604 comprises a linear array or equivalent staggered array of electrodes in contact or near contact with the background layer 403. A staggered array of electrodes may be used, for example, to minimize field crosstalk between otherwise adjacent electrodes and to increase display resolution.

Alternatively, one or both of the stated common electrodes may be made an addressable electrode array to allow, for example, colorant switching between parallel and perpendicular fringe fields. Positive and negative fields may be produced without requiring drives to produce positive and negative voltages. This can be accomplished by holding the common electrode(s) at an intermediate voltage level and cycling the array electrodes between a high and low voltage (e.g. ground). The display screen 602 is imaged by printing a column of pixels one row at a time as the electrode array(s) translates across the surface of the substrate 403. The image is viewed through the transparent view through 405 layer, so the electrode array 604 is not visible to the observer.

A standard scanning mechanism 601 (e.g. linear motor, cable drive, or the like) may be employed to move the electrode array across the full surface of the display substrate. Preferably the scanning mechanism 601 should include an array scan position feedback transducer to allow correct placement of fields from the array relative to the preferred pixel grid of the display. Such mechanisms include, for example, a motor shaft encoder or surface translation sensor as taught in U.S. Pat. Nos. 5,089,712 and 5,825,044, assigned to the common assignee of the present invention and incorporated herein by reference.

It can now be recognized that a display in accordance with the present invention requires no backlighting as required in conventional LCD displays, providing a device requiring a low supply power requirement. Lighting or backlighting becomes completely optional, depending on the specific implementation. Moreover, the power savings is greatly improved by the preferred embodiment wherein the molecules are structured to be substantially permanently bistable in the color or transparent mode once set. In essence, this is a power-free standby mode. Further, it is well-known that LCD-type displays have a limited viewing angle wherein moving off the axis diminishes viewability. The present invention, being a colorant stratum 401 at the surface of the display screen 400 (or behind the protective coating 405) has no such limitation, making it more CRT or HDTV like in appearance. Note further, the present invention is adaptable to implementations for digital video displays. Further, addressability may be resolved in the preferred embodiment wherein the pixels comprise bistable molecular switches by logic bus sequencing of pulses via the electrode matrix to the target pixels since, once set, no holding field is required, sweeping the display screen at a rate greater than the human discriminating capability (persistence).

Alternative Embodiments & Methods of Operation and of Doing Business

The displays of the present invention are envisioned to find application over a wide variety of product devices. FIGS. 7AA illustrates a business use of the present invention and, FIGS. 8AA, 9AA, 10AA, 11AA illustrate state of the art telecommunication appliances adapted to employ the present invention. Included in this list of uses are thin, light weight and low power reading appliances. Flat panel display devices having publishing quality resolution and readability will provide fully electronic substitutes for standard newspapers, magazines, books, CD-readers, and the like. As shown in FIGS. 2AA and 3AA, push-buttons, track-ball, stick mouse, or the like, manual control devices 201 located along the periphery of these reading appliances can be used to paginate and navigate between sections, articles and documents. Similar manual controls 201 and circuitry are provided to allow the user to input, store, sequence and display image data. Document data may be transferred via standard computer cable, IR or on-board memory sources such as CD and DVD disks 302 (FIG. 3AA only).

For compactness of device and user convenience it may be advantageous to have a retractable screen.

As illustrated by FIG. 7AA, wireless transceiver communication over the Internet (represented by cloud symbol 701) to, and document retrieval from, document content service provider(s) 703 is facilitated and greatly enhanced by the incorporation of the display technology in accordance with the present invention. The commercial appeal of wireless transceiver communication will be increased as use of a display screen in accordance with the present invention removes the problems of the prior art as described in the Background section hereinbefore. The ability to find, select, obtain for a greatly reduced cost, and read a hard copy print quality display of any document on the internet, anywhere, anytime, on a fully portable appliance advances the state of the art significantly.

In general, the service "PROVIDER" 703 is an Internet or intranet accessible, computer server 705, having a wireless transceiver ("SERVER XCVR") interface 707. A client browser accessible WEB SITE 709 includes all of the communications programs for browsing, selecting, paying for, and downloading selected content, e.g., a copy of the latest issue of the HP Journal.

A generically represented telecommunication appliance 711 (see also FIGS. 8AA–11AA) is provided with an on-board electronics package 715 (exploded, magnified, and represented as "on-board" the appliance 711 by dashed-arrow 713). Application specific integrated circuits ("ASIC") may be employed in implementing functions and programming associated with the invention. Included in the appliance 711 is an adapted implementation of the display screen 700 in accordance with the present invention.

The appliance 711 electronics package 715 includes a transceiver, "CLIENT XCVR," 717 adapted for communicating over the Internet 701 in a known manner. A BROWSER program 719 is provided for interactively communicating with the SERVER 705 web site 709. When the user of the appliance 711, the CLIENT, finds and purchases document content of interest, the content from the WEB SITE 709 is downloaded into the appliance memory 721 (it is known in the art to use data compression to limit the needed memory capacity to a reasonable size). Automatic downloads via subscription services for documents like daily newspapers (see FIG. 2AA) can be programmed. From memory, the CLIENT uses controls 201 to transfer pages of the document to the screen display 700.

Alternatively, or in addition to the wireless transceiver 717 interface, the telecommunications appliance 711 may include cable type interconnections for accessing the Internet 701.

In operation, as sent by the PROVIDER 703 from the WEB SITE 709, a first extracted page from the memory 721 transferred onto the display 700 will initially show in progressive order a menu, or index, of available document services, document categories, and document titles (and preferably an abstract of the content). The CLIENT can then use the BROWSER 719 as an interface. The CLIENT can place an order in real time, paying the invoiced amount—e.g., via a charge card or other credit information related data exchange with the PROVIDER 703, such as by having an account related to the appliance 711 serial number (analogous to a long distance telephone call)—and downloading the document immediately or at a later, convenient time. An attractive commercial implementation is for the PROVIDER 703 to offer any CLIENT the ability to obtain otherwise subscription documents such as newspapers, magazines, and the like, on a pay-per-view, non-subscription basis at a low cost as hard copy printing and mailing costs are eliminated. In placing an order, the display 700 is used to show ordering information, menus, lists, virtual shopping cart contents, and the like, provided by the from the SERVER 705 over the internet 701.

Figure 8:
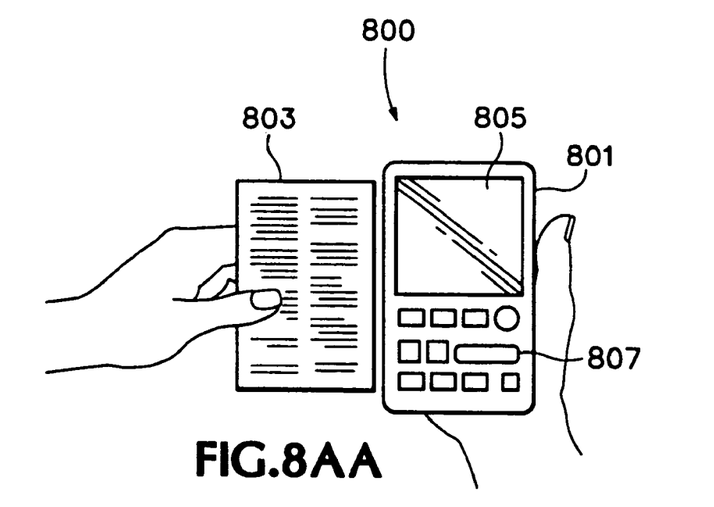
Figure 9:
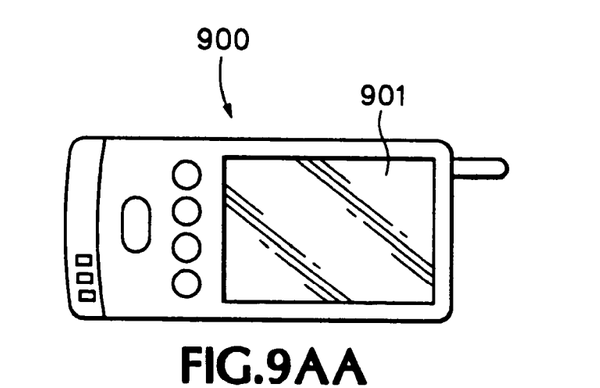
Figure 10:
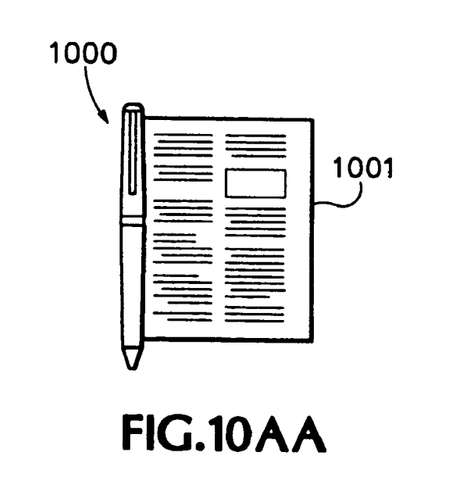
Figure 11:
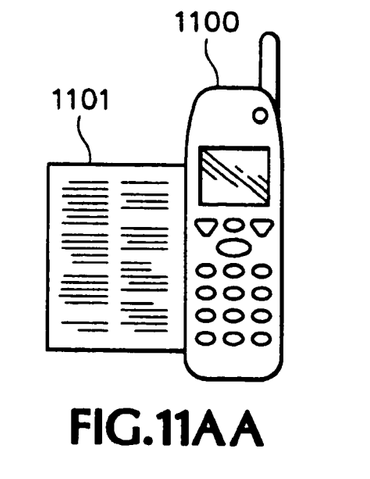

Exemplary specific implementations of the display in accordance with the present invention are shown in FIG. 8AA, a personal digital assistant 800 (having a retractable display 801), FIG. 9AA, a digital camera 900 with a fixed display screen 901 (note further, because of the fast switching capability, the present invention is adaptable to implementations for digital video displays), FIG. 10AA, a pen-sized device 1000 (e.g., a personal dictating device with voice recognition capability, allowing the dictation to be displayed on a retractable screen 1001), and FIG. 11A, a telephone 1100 (also illustrating a retractable screen 1101). These electronic appliances 800, 900, 1000, 1100 are exemplary for the category and not intended as a limitation on the scope of the invention. In operation, using for example the telephone 1100, the end-user could place a call to a restaurant and receive a menu display on the screen 801 from the restaurant's server transceiver from which an order can be immediately placed for delivery, pick-up, or eat-in at a selected table reservation time. Another exemplary specific implementation would be to telephone a retailer and receive a catalog display with immediate ordering capability. Note that for such "short" document uses, the memory 721 (FIG. 7AA only) may be a known manner cache memory or buffer.

In general, any appliance which has a visual display can be adapted to incorporate the present invention. Such appliances include, but are not limited to computers, computing machines of both hard-wired, fixed location and portable types, calculators, electronic books, monitoring instruments (including hospital equipment), musical instruments or music stands, networked workstations, personal digital assistants, telephones, televisions, test instruments, video games, or wired or wireless communication devices.

Known manner encryption technology can be employed where appropriate. Note that the appliance should include a read-only feature to protect the content provider's and author's copyrights. A part of the transmission protocol between the PROVIDER 7–3 and the appliance 711 may include markers that command non-read-only devices such as the PDA of FIG. 8AA to prevent a printout.

In general, known manner voice and image data packet protocols can be employed in accordance with the state of the art.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . "

What is claimed is:

1. A method of document retrieval using an internet, the method comprising:

from a telecommunications appliance, ordering a document over the internet;

downloading the document from the internet into the telecommunications appliance; and displaying the document on a display associated with the telecommunications appliance by forming an image of the document on a pixel array of a rewritable bi-modal molecular colorant.

2. A method of doing business with respect to document publishing and retrieval, the method comprising:

providing a wireless communications site including a server for publishing document content; and downloading from said site to a wireless telecommunications appliance document content data for read-only display by forming a selectable page-by-page pixel array on a bi-modal molecular colorant display associated with said appliance.

* * * * *